United States Patent
Vollath

(10) Patent No.: US 9,417,328 B2
(45) Date of Patent: Aug. 16, 2016

(54) GLOBAL NAVIGATION SATELLITE ANTENNA SYSTEMS AND METHODS

(71) Applicant: Ulrich Vollath, Ismaning (DE)

(72) Inventor: Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 151 days.

(21) Appl. No.: 14/044,579

(22) Filed: Oct. 2, 2013

(65) Prior Publication Data

US 2014/0028497 A1    Jan. 30, 2014

Related U.S. Application Data

(62) Division of application No. 12/927,536, filed on Nov. 17, 2010, now Pat. No. 8,669,900.

(51) Int. Cl.
*G01S 19/22* (2010.01)
*G01C 15/00* (2006.01)

(52) U.S. Cl.
CPC .................. *G01S 19/22* (2013.01); *G01C 15/00* (2013.01)

(58) Field of Classification Search
CPC ....................................................... G01S 19/22
USPC .............. 342/357.34, 357.61, 358; 701/478.5
See application file for complete search history.

(56) References Cited

U.S. PATENT DOCUMENTS

| | | | |
|---|---|---|---|
| 5,119,103 A | 6/1992 | Evans et al. | |
| 5,510,889 A | 4/1996 | Herr | |
| 5,790,243 A | 8/1998 | Herr | |
| 6,292,132 B1 | 9/2001 | Wilson | |
| 6,421,000 B1 | 7/2002 | McDowell | |
| 6,597,316 B2 | 7/2003 | Rao et al. | |
| 6,633,256 B2 | 10/2003 | Zhdanov et al. | |
| 6,664,921 B2 | 12/2003 | Pratt | |
| 6,727,846 B1 | 4/2004 | Brown | |
| 7,116,270 B2 | 10/2006 | Obata | |
| 8,164,514 B1* | 4/2012 | Yang ..................... | G01S 5/0257 342/357.28 |
| 8,344,947 B2 | 1/2013 | Tocker | |
| 2002/0084945 A1 | 7/2002 | Huebner | |
| 2004/0066335 A1 | 4/2004 | Ashjaee | |
| 2007/0024497 A1* | 2/2007 | Shibata ................... | G01S 19/22 342/357.61 |

FOREIGN PATENT DOCUMENTS

| | | |
|---|---|---|
| EP | 0542297 A1 | 5/1993 |
| EP | 1491910 A1 | 12/2004 |
| EP | 2246994 A2 | 11/2010 |

OTHER PUBLICATIONS

The State Intellectual Property Property Office for the People's Republic of China (PRC), Official Letter, Dec. 4, 2013.
German Patent and Trademark Office, Official Action, Nov. 27, 2013.
B. J. H. Van Den Brekel and D.J. R. VAn Nee, GPS Multipath Mitigation by Antenna Movements, Electronics Letters, Dec. 3, 1992, pp. 2286-2288, vol. 28 No. 25.

\* cited by examiner

*Primary Examiner* — Dao Phan
(74) *Attorney, Agent, or Firm* — Cooper & Dunham LLP

(57) ABSTRACT

A method for reducing multipath when determining a location of a stationary or near stationary position, includes receiving a signal from an antenna moving continuously with respect to the stationary or near stationary position, the signal including a multipath component, processing the received signal including the multipath component, wherein multipath error in the received signal is reduced during the processing and determining a location of the stationary or near stationary position based on the processed received signal with the multipath error reduced.

27 Claims, 10 Drawing Sheets

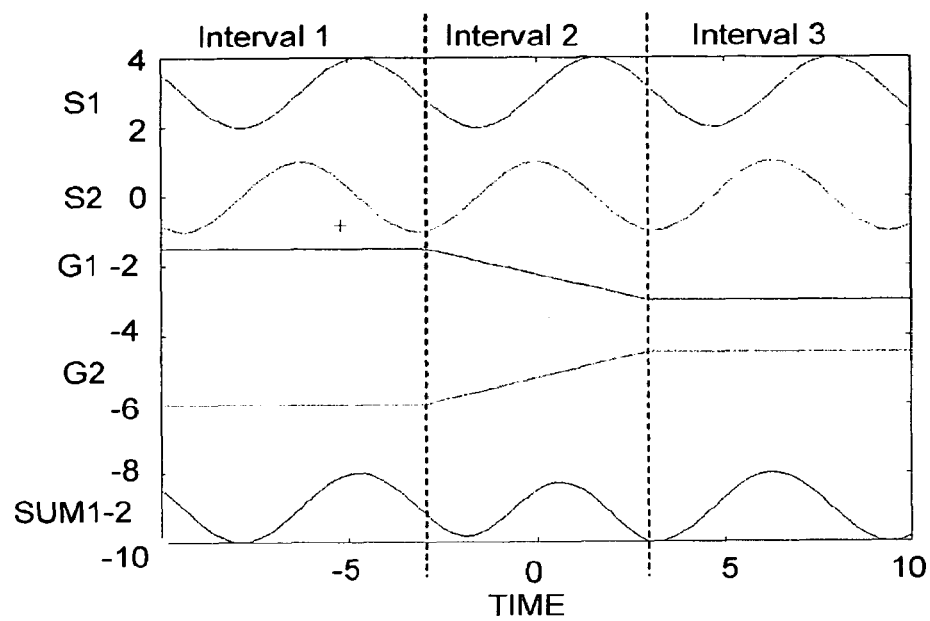
Figure 15
Figure 16
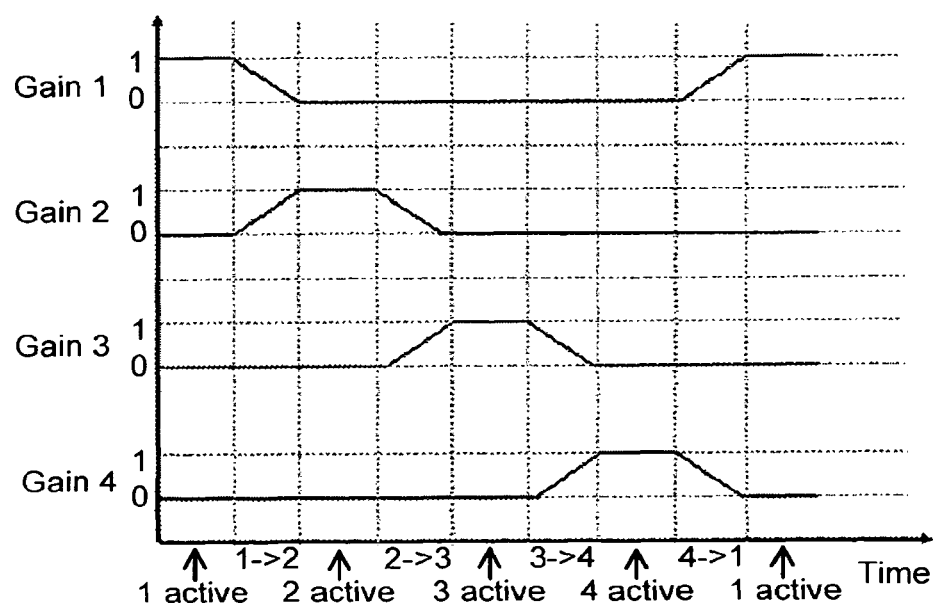

GLOBAL NAVIGATION SATELLITE ANTENNA SYSTEMS AND METHODS

CROSS-REFERENCE TO RELATED APPLICATION

This application is a divisional of U.S. application Ser. No. 12/927,536, filed Nov. 17, 2010, the entire contents of which are incorporated herein by reference.

BACKGROUND

1. Technical Field

The present disclosure relates to Global Navigation Satellite Systems and, more particularly, to global navigation satellite antenna systems and methods.

2. Description of the Background Art

The present disclosure relates to Global Navigation Satellite System (GNSS) antenna systems and methods.

GNSS refers to various satellite based navigation systems used to determine the position of a user's receiver virtually anywhere in the world. Several GNSS systems are presently in operation including, for example, the Global Positioning System (GPS) operated by the United States of America and the Global Orbiting Navigation Satellite System (GLONASS) operated by the Russian Federation. GNSS is used extensively by both military and civilian sectors.

Each GNSS includes a plurality of satellites working together with a network of ground stations using a form of triangulation to locate the user's receiver. Each satellite transmits coded signals at precise intervals. The user's receiver converts the received signals into position, velocity and time estimates. The receiver can then calculate the exact position of the transmitting satellite and the distance (from the transmission time delay) between it and the receiver. By coordinating signal data from multiple satellites, the receiver is capable of determining its position.

Although GNSS provides a highly reliable and accurate ability to locate a receiver's position, it is not without fault. GNSS performance can be subject to several errors including ionosphere delay, troposphere delay, receiver noise and multipath. Multipath (also referred to herein as phase multipath and pseudorange multipath) is the major source of error in GNSS applications.

Multipath refers to a phenomenon occurring when a wave from a single source travels to a receiver via two or more paths resulting in components of the same wave being out of phase. This can occur, for example, because of extraneous reflections of the signal from objects such as buildings, the ground, trees, water surfaces, etc. Under the right conditions, the two (or more) components of the wave can interfere resulting in tracking errors in the receiver.

Various techniques have been used in attempts to mitigate problems caused by multiphase including improved antenna designs, improved receiver internal architecture and improved post-processing techniques.

In optimal conditions, GNSS systems allow for mm-level positioning. However, in environments suffering from multipath, the errors can grow by a factor of 2-5. Accordingly, phase multipath remains a major problem in GNSS positioning

SUMMARY

A method for reducing multipath when determining a location of a stationary or near stationary position, includes receiving a signal from an antenna moving continuously with respect to the stationary or near stationary position, the signal including a multipath component, processing the received signal including the multipath component, wherein multipath error in the received signal is reduced during the processing and determining a location of the stationary or near stationary position based on the processed received signal with the multipath error reduced.

A system for reducing multipath when determining a location of a stationary or near stationary position, includes a moving platform having an antenna mounted thereto, the moving platform moving the antenna continuously with respect to the stationary or near stationary position, a receiver for receiving a signal from the continuously moving antenna, the signal including a multipath component, a processor for processing the received signal including the multipath component, wherein multipath error in the received signal is reduced during the processing and a location determining unit for determining a location of the stationary or near stationary position based on the processed received signal with the multipath error reduced.

A system for reducing multipath error when determining a location of a stationary or near stationary position, includes a plurality of antennas arranged in positions fixed with respect to the stationary or near stationary position, a combining unit for combining signals from the plurality of antennas and outputting a compound received signal, the compound received signal including a multipath component, a processor for processing the compound received signal including the multipath component, wherein multipath error in the compound received signal is reduced during the processing and a location determining unit for determining a location of the stationary or near stationary position based on the processed compound received signal with the multipath error reduced.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 15 depicts two signals being combined; and

FIG. 16 depicts an example of gains of antenna output signals according to an embodiment of the present disclosure.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1A:
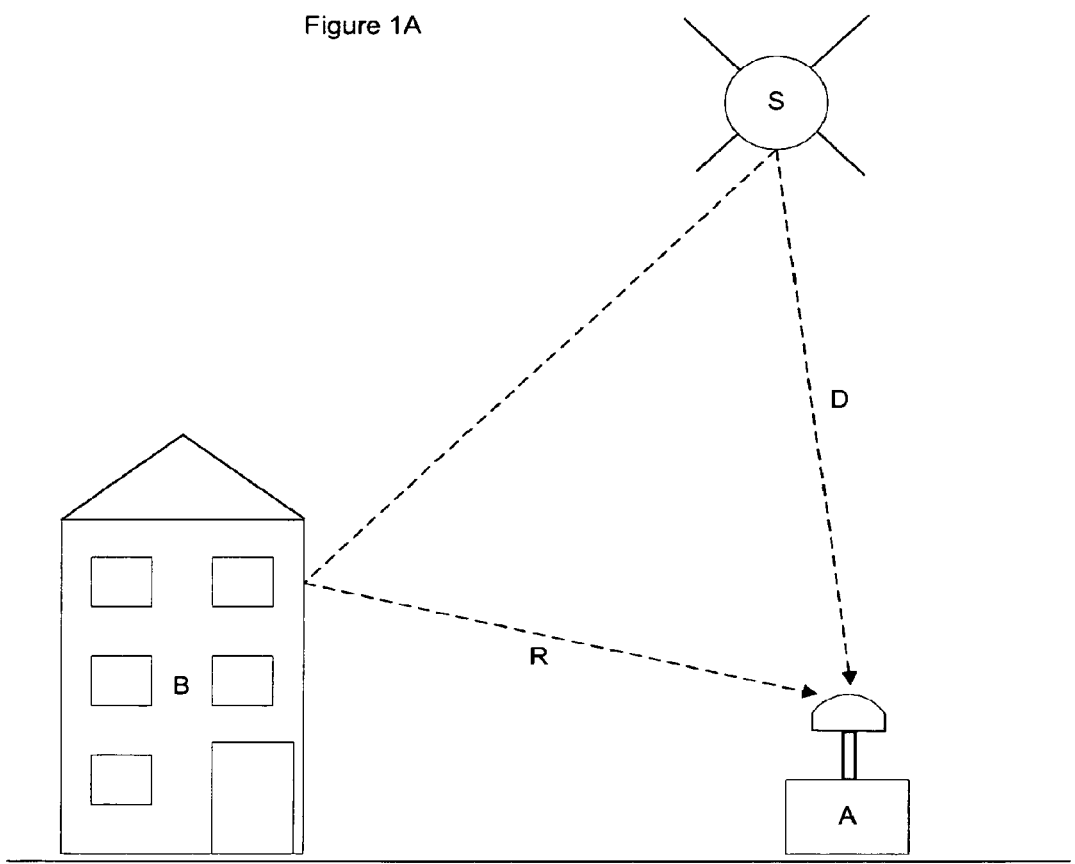
FIG. 1A shows an example of a possible cause of multipath in a GNSS system.
Figure 1B:
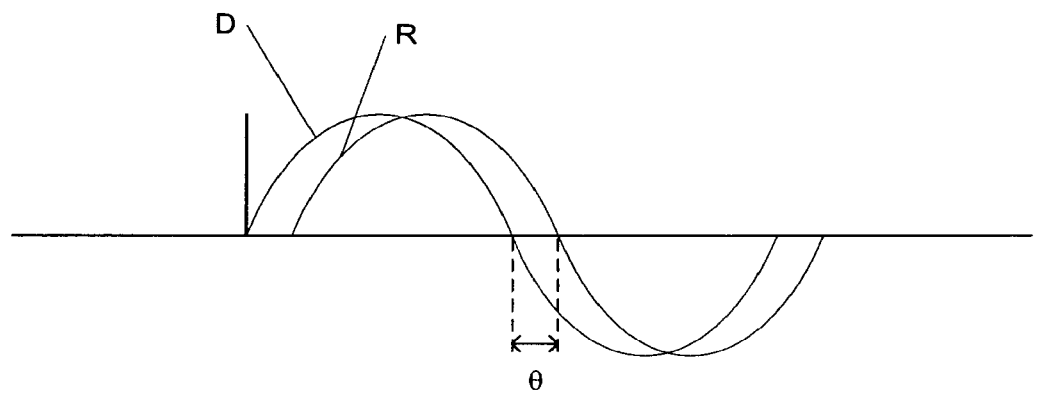
FIG. 1B shows the phase difference in coherent directly received and reflected signals.

Although various levels of the atmosphere may affect a satellite signal, a carrier wave generally propagates from a satellite (S) along a straight line (D) to receiver/antenna (A) as shown in FIG. 1A. Multipath is the effect caused by the carrier wave reflecting (R) from nearby objects (e.g., building (B)). Reflections can be caused by many other types of man made structures and/or naturally occurring surfaces including, for example, the ground, trees, water, etc. FIG. 1B depicts the phase shift θ when coherent waves (D) and (R) travel along two different paths and arrive at the receiver/antenna (A).

By its nature, the change in phase multipath error over time is relatively slow. This is particularly true for a stationary or near stationary antenna. For example, the phase multipath error change with time for a stationary or near stationary antenna can be in the minute range or longer. On the other hand, with a moving antenna, the phase multipath error changes substantially quicker.

Figure 2:
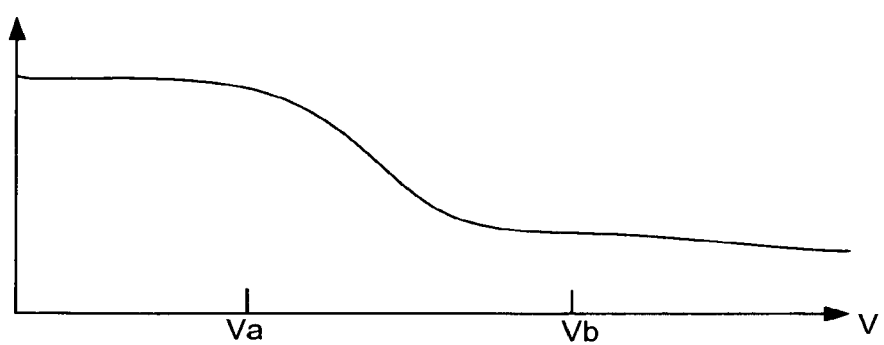
FIG. 2 shows the effect of velocity on multipath interference.

A quickly changing multipath signal can be averaged or filtered out relatively quickly during processing, while a slowly changing multipath signal will not readily average or filter out during processing. Accordingly, the multipath impact on positioning is far less for moving antennas than it is for stationary antennas. This phenomenon is illustrated in FIG. 2 which shows the effect of antenna velocity (V) on multipath interference. As shown, the multipath interference decreases as the velocity of the antenna increases.

The present disclosure is concerned with reducing the effect of multipath in GNSS systems and particularly its effect on stationary or near stationary GNSS antennas where multipath interference is generally the highest.

Figure 4:
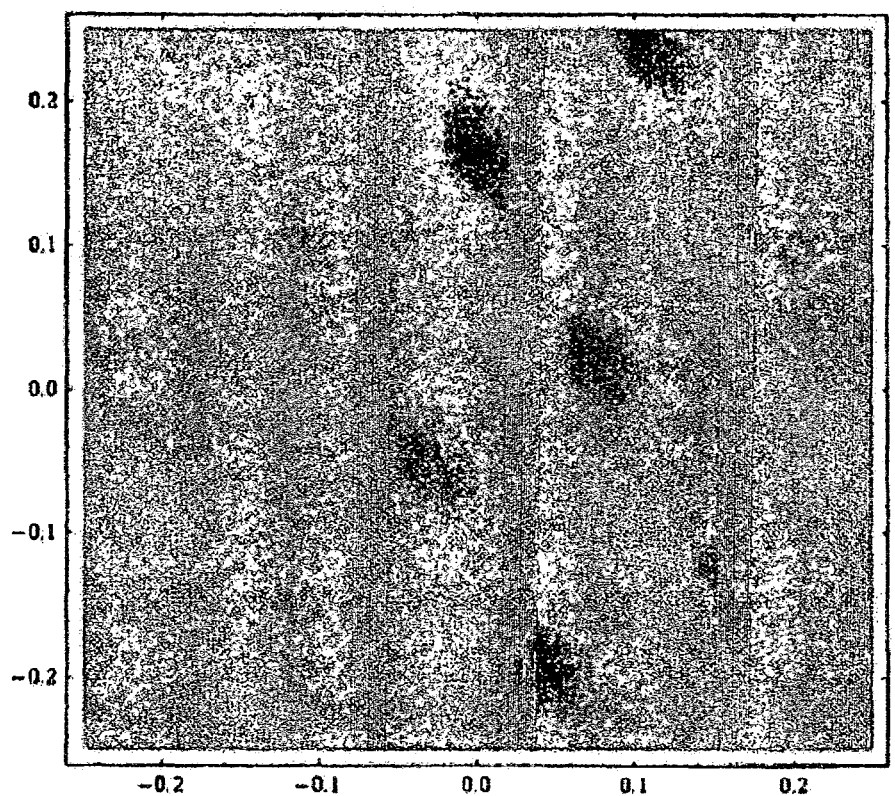
FIG. 4 shows an example of a simulation of L1 carrier phase multipath errors in an area around a fixed antenna.

FIG. 4 is an image showing the simulation of L1 carrier phase multipath errors in the area of +/−25 cm around a fixed antenna caused by three specular reflectors. The image shows the maxima and minima in the area around the antenna.

According to an embodiment of the present disclosure, the GNSS receiver antenna is made to move with respect to a stationary or near stationary position, in a well-defined pattern covering at least one wavelength of the signal in question. In particular, the antenna should move in a pattern such that it experiences maxima and minima of the possible multipath effects in the vicinity of the antenna. For example, for a GNSS signal having a particular wavelength (19 cm for GPS L1, 24 cm for GPS L2), the path of the antenna should cover at least one wavelength of the signal in question, so that the tracked data will experience maxima and minima of the possible multipath effects in the vicinity of the antenna. In this way, the multipath will change as fast as the antenna is moving and will include the maxima and minima multipath values. Accordingly, the normally relatively slow changing multipath is converted into multipath changing relatively quickly. This allows the multipath to be effectively averaged or filtered out during processing. Moreover, if the motion path of the antenna is known, the signals received at the moving antenna can be used to reference back to the actual position of interest (e.g., the stationary or near stationary position about which the antenna moves).

Figure 3A:
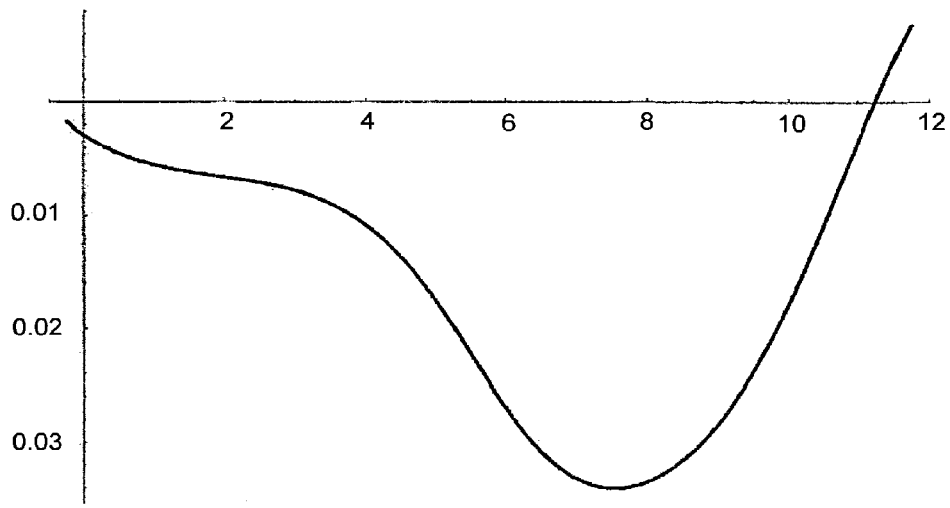
FIG. 3A shows an example of a simulation of static multipath.

FIG. 3A shows an example of the results of a simulation in which three specular reflectors are arranged in the vicinity of a static antenna. The x-axis represents time (t) in seconds and the y-axis represents the change in phase multipath error in meters. As shown, this change is quite slow. Since the phase multipath error shows little or no cyclical pattern for the time period in question, the multipath does not average out during processing. It would be difficult to perform any type of computation to average out the multipath error quickly enough to be of any practical use.

Figure 3B:
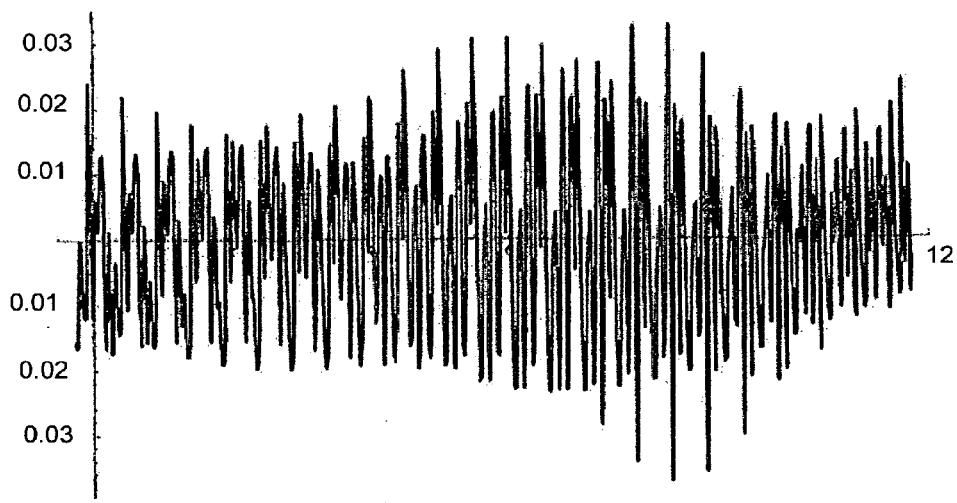
FIG. 3B shows an example of a simulation of multipath for an antenna moving in a circular pattern according to an embodiment of the present disclosure.

FIG. 3B shows the same simulation for an antenna moving in a circular pattern having a diameter of 25 cm which is larger than the GNSS wavelengths (e.g., L1, L2). As shown, the multipath of the tracked data experiences maxima and minima of the possible multipath effects in the vicinity of the antenna at a much faster rate (e.g., proportional to the rate of movement of the antenna along the circular path). Since the multipath error for the moving antenna shows a cyclical pattern changing at a relatively quick rate, the multipath error is readily averaged or filtered out during processing.

Figure 5:
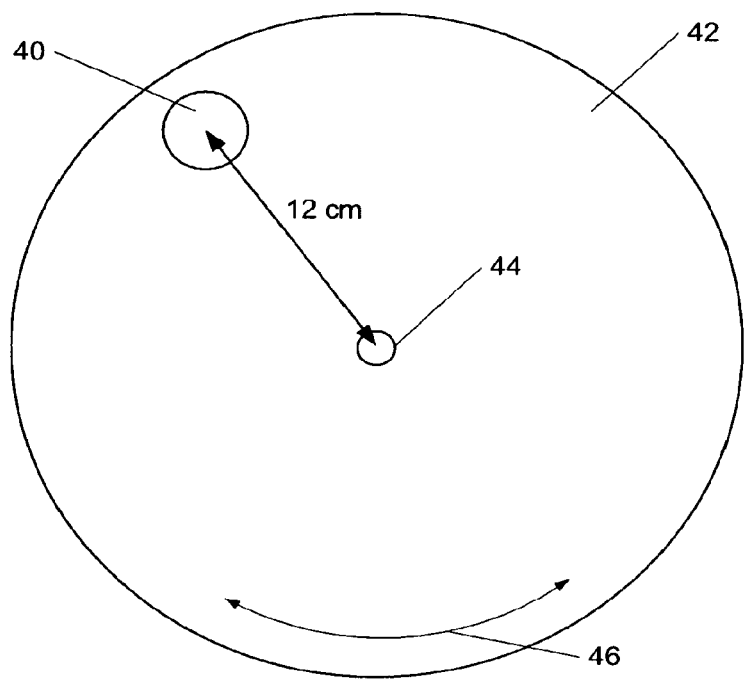
FIG. 5 shows a top view of an example of an antenna mounted on a rotating platform, according to an embodiment of the present disclosure.
Figure 6:
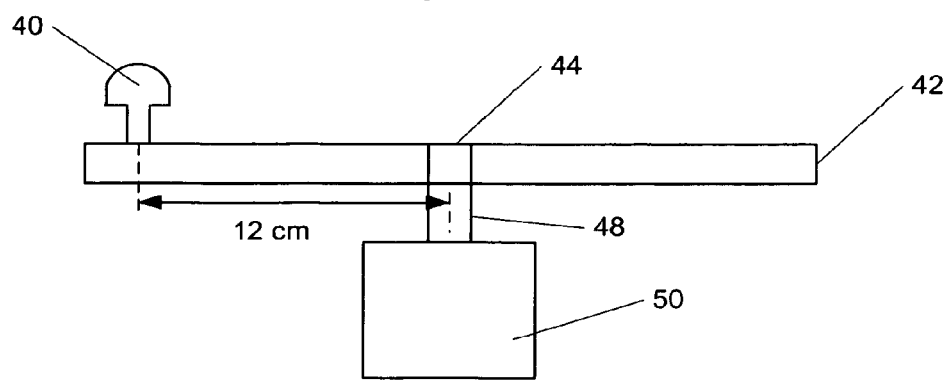
FIG. 6 shows a side view of the antenna mounted on the rotating platform, according to an embodiment of the present disclosure.

According to an embodiment of the present disclosure as shown in FIG. 5, antenna 40 is arranged on a rotating platform 42. Antenna 40 is mounted at least approximately 12 cm from the axis 44 at which rotating platform 42 rotates. Platform 42 can rotate in a clockwise or counter clockwise direction as shown by arrows 46. In this way, when platform 42 is rotated, antenna 40 will move in a circle having a diameter of 24 cm. An example of a system for providing such a range of motion is shown in FIG. 6. As shown, according to this embodiment of the present disclosure, antenna 40 is arranged on the rotating platform 42 which is driven by driving motor 50 via drive shaft 48.

The speed at which platform 42 rotates should be at least 10 rpm and preferably 30 rpm so that the rate of change of the multipath signal is sufficient to be effectively averaged or filtered out during processing. Of course, the speed of rotation may vary, as long as the relative position of the antenna during movement can be determined in another way (e.g., utilizing angular sensors.)

Figure 7A:
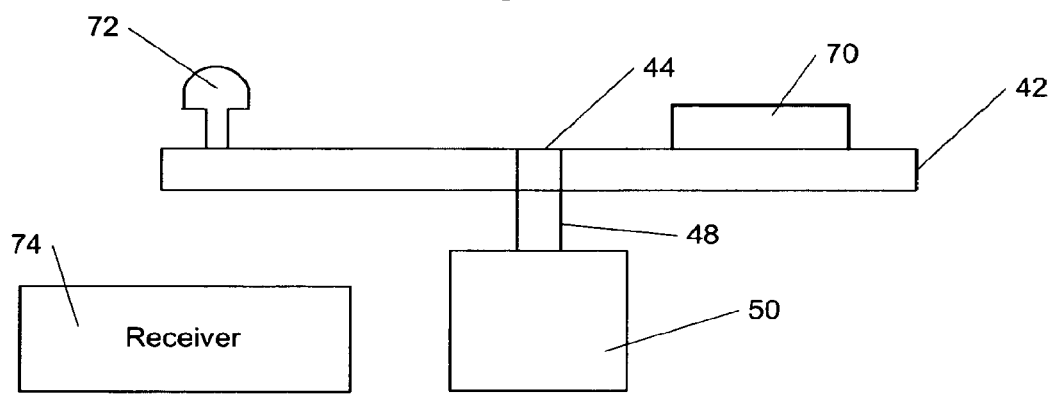
FIGS. 7A, 7B show examples of ways of providing signals from the antenna rotating on the platform to a receiver, according to embodiments of the present disclosure.

A system is provided for communicating the signal from the antenna rotating on platform 42 to a receiver in a manner to avoid twisting and damaging the antenna cable. According to one embodiment this can be done by providing the receiver 70 on the same platform 42 as the antenna 72, as shown in FIG. 7A. Antenna 72 can then be connected directly to receiver 70 via a shielded cable (not shown). Receiver 70 can also be provided with wireless capabilities for transmitting the received information (observables) to another receiver 74 provided at a location other than on the platform, for easy viewing by a user.

Figure 7B:
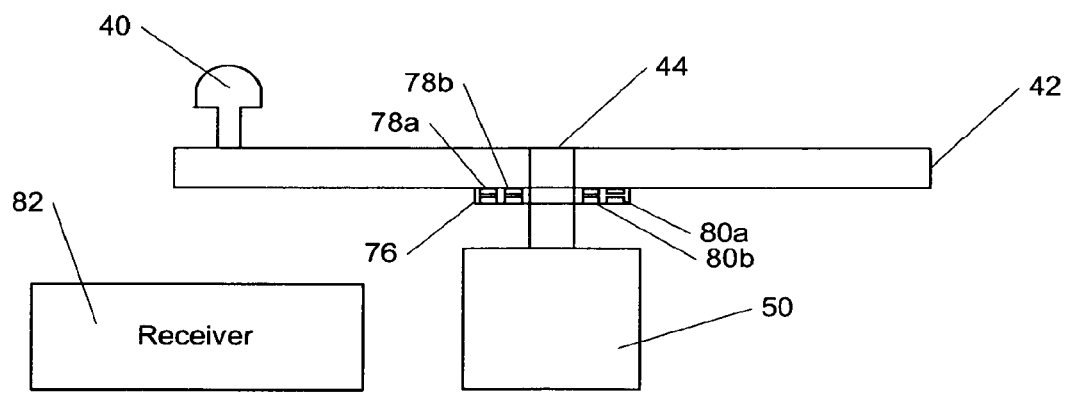

According to another embodiment shown in FIG. 7B, a device such as a ring wheel 76 can be provided for transferring the signal from the antenna rotating on the platform to a stationary receiver. Electrically conductive brushes 78a, 78b are arranged in a circular pattern on the bottom of platform 42. Corresponding conductive brushes 80a, 80b are arranged in a corresponding circular pattern on stationary ring wheel 76. Brush 78a is in continuous electrical contact with brush 80a while platform 42 is rotating. Brush 78b is in continuous electrical contact with brush 80b while platform 42 is rotating. Brushes 78 are electrically connected to antenna 40 via a cable (not shown). Brushes 80 are electrically connected to receiver 82 via a cable (not shown). In this way, the signals received by rotating antenna 40 can be communicated to a stationary receiver 82.

According to another embodiment of the present disclosure, in order to avoid twisting and damaging the antenna cable, the rotating platform shown in FIGS. 5, 6 can be arranged to move 360° in one direction (clockwise) and then 360° in the other direction (counter clockwise).

Figure 8:
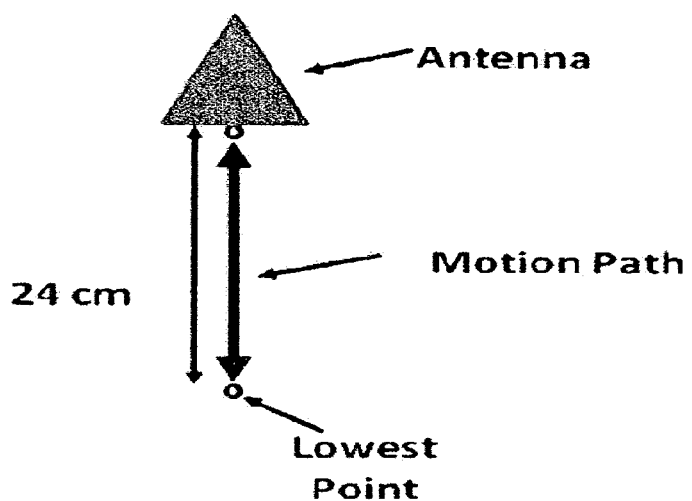
FIG. 8 shows an example of an antenna being moved in a vertical direction, according to an embodiment of the present disclosure.

According to yet another embodiment, antenna cable twist problems can be avoided by moving the antenna up and down in a vertical direction as shown in FIG. 8. In this embodiment, the antenna should move up and down a total distance of at least one wavelength of the signal in question.

Although the antennas in the above-described embodiments have been shown moving in a circular pattern or up and down in a vertical direction, it will be appreciated that the present disclosure is in no way limited to those particular patterns or directions. For example, the antenna could be arranged to move in a combination of directions by combining the systems shown in FIG. 6 and FIG. 8. That is, the antenna can be made to move up and down in a vertical direction and at the same time move around in a circular pattern. According to yet another embodiment, the antenna can be made to move in a more complex pattern covering more of the area around the antenna. For example, the antenna can be made to move in epicycles.

In order to effectively average or filter out the multipath error, it is preferable that whatever pattern is used, the antenna traverse a sufficient distance that the tracked data will experience maxima and minima of the possible multipath effects in the vicinity of the antenna.

Since the antenna is moving in a known pattern, it is relatively easy to determine the actual position of interest from the data received from the antenna. For example, a stepper motor can be used to rotate the platform. The position of the stepper motor and thus the antenna can then be provided to the GNSS receiver. The received GNSS information and the stepper motor position information can then be used to determine the exact location of the actual position of interest. For example, in the embodiments in which the antenna rotates around a stationary or near stationary position, the position of interest could be the stationary or near stationary position itself. According to another embodiment, the position (e.g., heading) of the rotating antenna can be determined using a heading sensor (rotation sensor). From this information and the received GNSS information, the location of the position of interest can be readily determined. The position of the antenna could also be determined using the precise GNSS RTK positions.

For kinematic positioning, additional inertial sensors can be provided on the rotating antenna platform which can provide sufficient knowledge about the short-term motion of the antenna to allow for the desired averaging effect of the position errors. In principle, reducing kinematic (e.g., on a moving rover) data to a well-defined antenna reference point can be performed in similar fashion to the above-described embodiments. One difference is that the relative orientation of the antenna system with respect to the GNSS coordinate system (e.g. WGS84) has to be known. However, methods for determining the relative orientation of the antenna system with respect to the GNSS coordinate system are well-known when using INS or other attitude sensors like absolute heading and tilt sensors.

For static receivers (e.g., reference stations), the observables (e.g., code and phase measurements) can be referenced back to the defined station position, thus yielding an apparent static observable data stream for processing by conventional processing software. The technique can be simultaneously applied to a moving user and to the reference station.

To transform the measurements collected from the moving antenna to refer to the stationary antenna reference point, the following approach can be used: Let $$\vec{r} = \begin{pmatrix} r_x \\ r_y \\ r_z \end{pmatrix}$$

be the approximate antenna reference position, $$\vec{d} = \begin{pmatrix} d_x \\ d_y \\ d_z \end{pmatrix}$$

the distance vector of the moving antenna position to the antenna reference position and $$\vec{s} = \begin{pmatrix} s_x \\ s_y \\ s_z \end{pmatrix}$$

approximate satellite position. Then the approximate range between satellite and antenna is:

$$R = \sqrt{(\vec{s} - \vec{r})^T (\vec{s} - \vec{r})}.$$

The range correction is computed as:

$$\Delta R = \frac{(r_x - s_x) \cdot d_x + (r_y - s_y) \cdot d_y + (r_z - s_z) \cdot d_z}{R}$$

To compute the corrected carrier phase measurements $\phi'$ from the original phase measurements $\phi$ the following formula is used:

$$\phi' = \phi - \frac{\Delta R}{\lambda},$$

where $\lambda$ is the wavelength of that carrier measurement.

Similarly, the corrected pseudorange measurements $\rho'$ are computed from the original pseudorange measurements $\rho$:

$$\rho' = \rho - \Delta R$$

The distance vector $$\vec{d} = \begin{pmatrix} d_x \\ d_y \\ d_z \end{pmatrix}$$

can be computed from the relative moving antenna information like heading and radius utilizing well known techniques.

The multipath mitigation effect can also be exploited for the pseudorange observables. This has an effect on the initialization times for an RTK system and improves code-base positioning (DGPS). As the data examples show in the code-carrier plots (e.g., see FIGS. 10, 12), the pseudorange multipath gets improved (easier to filter or average out) in a similar way to the carrier phase shown in the ionospheric residual plots (e.g., see FIGS. 9, 11.) The convergence of an RTK initialization is substantially influenced by pseudorange multipath, and DGPS relies on the pseudorange including its errors.

The antenna motion path can lead to antenna rotation around its vertical axis. Other mechanical solutions might avoid that. If the antenna is rotating around its axis, the antenna phase center pattern variation can be corrected using a proper antenna phase center variation model. It will be appreciated that correcting antenna phase centers is state-of-the-art GNSS technology. There are several products presently on the market that can be used to compensate for known antenna heading and tilt.

Figure 13:
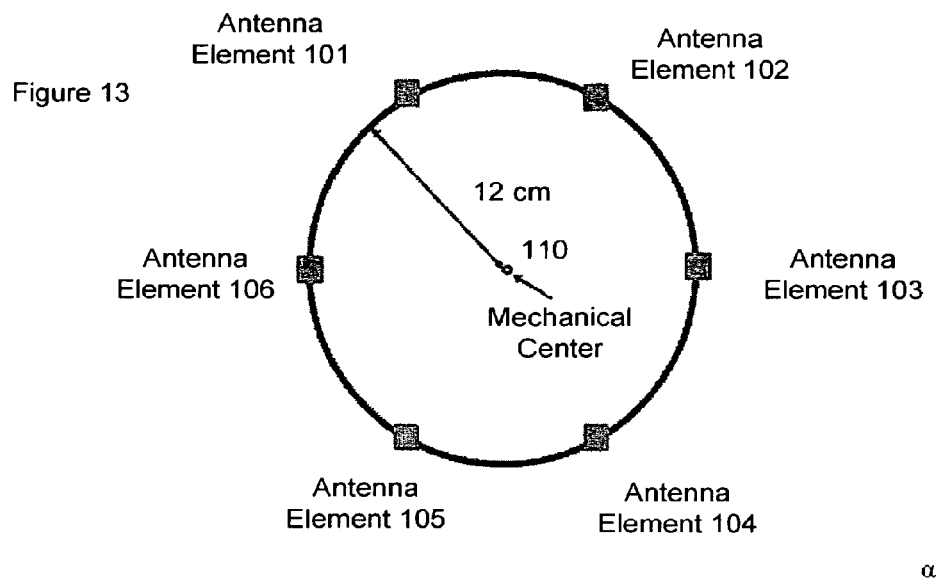
FIG. 13 depicts a fixed antenna array arrangement according to an embodiment of the present disclosure.

According to another embodiment of the present disclosure, in place of using mechanically moving antenna, multiple fixed antenna elements are spread over an area around a measured position. FIG. 13 shows a physical layout of a plurality of antenna elements arranged in a hexagonal pattern according to an embodiment of the present disclosure.

In this embodiment, antenna elements 101-106 are provided at fixed positions around an imaginary circle 108 having a radius of 12 cm and a center 110. In this embodiment, the antennas are arranged approximately 60 degrees apart. If the distance between any two furthest separated antennas exceeds at least one GNSS wavelength (19 cm for GPS L1, 24 cm for GPS L2), the antenna elements will experience significantly different multipath errors at a given point in time. The multipath errors can then be averaged and/or filtered out utilizing appropriate processing techniques as discussed above with respect to the previous embodiments.

According to this embodiment, the signals from each of the antennas are combined so that a single receiver is used for all antenna elements. This avoids the need of having to use complicated electronics to combine the signals. One way of combining the signals would be to use RF switches. However, by switching the signals in this manner a discontinuity could be introduced in the resulting signal, resulting in lose of phase lock so that tracking periods would have to be handled completely separately.

To avoid such discontinuity, the present embodiment uses variable attenuators (e.g., voltage variable attenuators) to blend the signals from the antenna elements. According to this embodiment; signals from the multiple antenna elements are continuously blended and after a sufficient period of time, the signal from one of the antenna elements is exclusively selected for a period of time to collect data for that location (e.g., 10 msec minimum).

Figure 14:
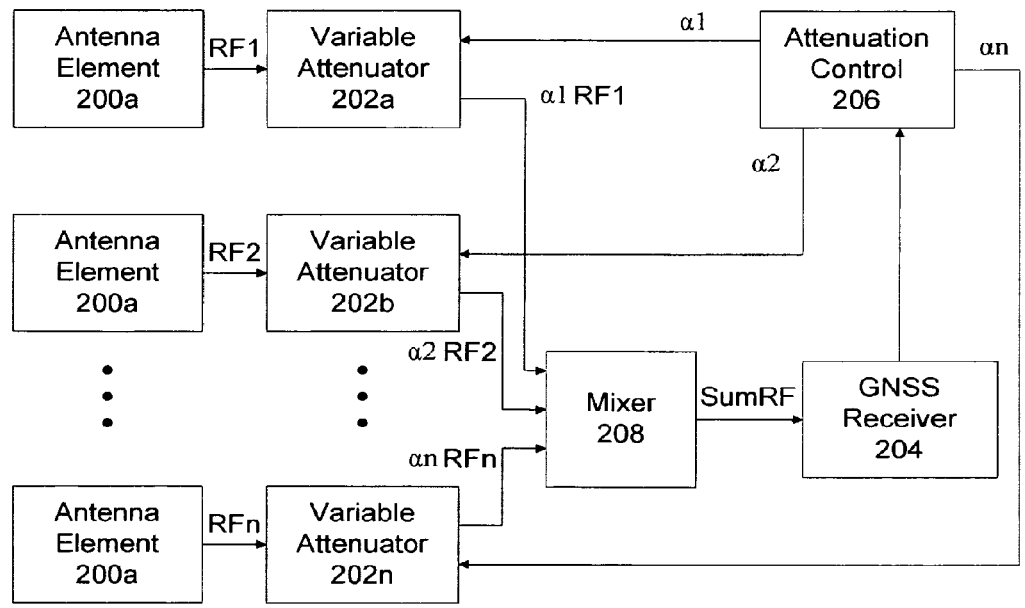
FIG. 14 is a schematic for describing a system for combining output signals from multiple antenna.

FIG. 14 is a schematic showing an arrangement for processing signals from the multiple antenna elements using one GNSS receiver according to an embodiment of the present disclosure. The system includes n antenna elements 200a-200n arranged in a fixed array as described above. Each antenna's RF output (RF1-RFn) is fed into a variable attenuator (202a-202n). GNSS receiver 204 controls attenuation controller 206 which in turn provides control signals a1-1n to variable attenuators 202a-202n. Attenuation controller 206 controls the attenuation of the output signal from each variable attenuator by varying the voltage amplitude of the control signal. For example, a 5 volt control signal will provide minimum attenuation (e.g., unity or maximum gain) and a 0 volt control signal will provide maximum attenuation of the output signal. The attenuation will vary linearly between minimum attenuation and maximum attenuation as the voltage of the control signal is gradually reduced from 5 volts to 0 volts. The outputs of variable attenuators 202a-202n are then fed into mixer 208 where the signals are summed and output as a combined RF signal SumRF which is input to GNSS receiver 204 for processing.

FIG. 15 shows an example of how two out of phase signals can be continuously blended with no discontinuity utilizing a system similar to that shown in FIG. 14. Signals S1 and S2 represent the respective inputs to individual voltage variable attenuators. The gains of the variable attenuators are controlled to provide the gains shown by lines G1 and G2. Initially, during Interval 1, signal S1 is not attenuated and is allowed to pass, while signal S2 is attenuated. During Interval 2, signal S1 is gradually attenuated and signal S2 is gradually amplified until Interval 3 is reached at which point signal S2 is not attenuated and signal S1 is attenuated. Signal SUM1-2 is the result of mixing or summing the attenuator output signals. The resulting signal is similar to multipath from a string reflector which a GNSS receiver can easily track without loss of lock. By continuously blending the outputs of the antenna elements, the receiver tracking loops can maintain phase lock. Accordingly, cycle slips do not occur and the data can be handled in a manner similar to the mechanically moving antenna embodiments described above.

FIG. 16 shows an example of the gain for the output of each antenna over time for four antenna elements. In this figure, a gain of 0 means maximum attenuation and a gain of 1 means a minimum attenuation. By controlling the gains of the outputs of these antenna signals, a single combined signal can be provided. The present embodiments also avoid problems commonly found in phased antenna arrays in which it can be difficult to model the antenna phase center variation pattern of the combined antenna fed into the receiver. In the present embodiments, during the steady phase of tracking, the phase center model of a single element can be applied.

The exact number of antennas, their spacing and/or geometry of placement can be modified as desired to achieve similar results, as long as each antenna's placement in relation to an imaginary point or position of interest is known so that the measurements can be referred back to the position of interest.

Simulations show the multiple stationary antenna element embodiments are quite effective at removing multipath. For six stationary antenna elements arranged according to embodiments of the present disclosure, the resulting multipath after one period of revolution was twice as much as for the rotating antenna, but still significantly lower than for a single static antenna. Eight stationary antenna elements arranged according to embodiments of the present disclosure had a comparable performance to the mechanically rotating antenna element embodiments described above.

For static receivers (e.g. reference stations), the observables (e.g. code and phase measurements) can be referenced back to the defined station position, thus yielding an apparent static observable data stream for processing by conventional processing software. The technique can be applied to a moving user and to the reference station used simultaneously.

In principle any number of antenna elements can be used in any geometric placement. Simulations have shown polygonal placement of antenna elements to be most effective, particularly if an additional antenna element is arranged at the center. The present disclosure also contemplates other irregular antenna placement patterns for optimization, as could be discovered by experimentation, trial and error and/or simulation.

Techniques have been introduced for phased antenna arrays shrinking the form factor of an antenna array by using a dielectric "lens". Though this generally has an approximate 10 dB attenuation effect on the antenna gain, the systems and methods described herein may be utilized with those techniques for special applications (e.g., portable devices, etc), especially when using the new L2C signal.

Utilizing aspects of embodiments of the present disclosure, attitude determination can be made with a single antenna or with multiple stationary antennas. The relative motion of the rotating antenna or multiple stationary antennas can be determined using inertial sensors, with the data received by the antenna then providing information about heading and two-dimensional tilt. The systems and methods described herein can also be applied to more than one antenna moving simultaneously at different locations, thus improving attitude determination.

Figure 9:
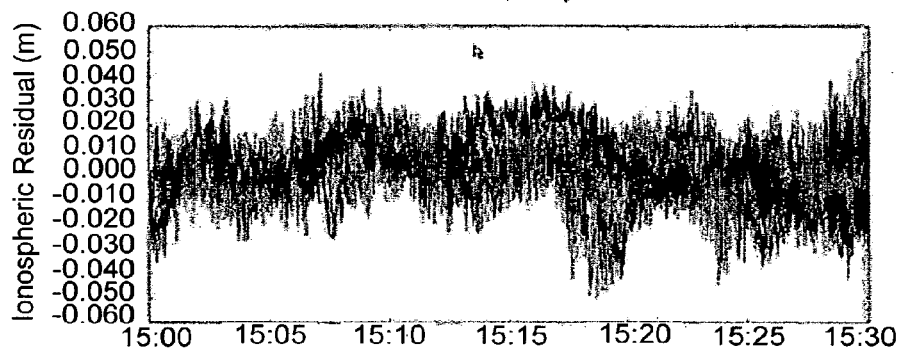
FIGS. 9 and 10 show experimental results on observables for an antenna mounted on a platform which is rotating according to an embodiment of the present disclosure.
Figure 10:
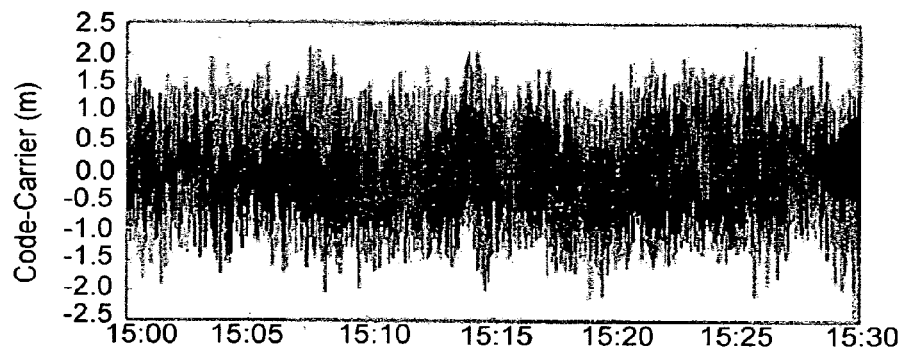

Experimental results in multipath errors are depicted in FIGS. 9, 10 which show the carrier phase and pseudorange multipath, respectively, for ½ hour of collected data while the antenna arranged as shown in FIG. 5 was rotating. The observables shown are geometry free and thus allow inspecting the observable errors without any influence of a possibly inaccurately known antenna location.

Figure 11:
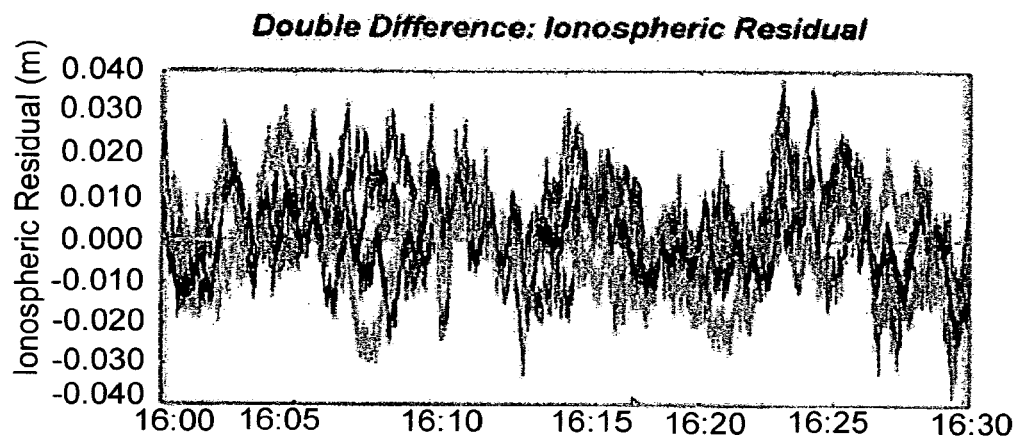
FIGS. 11 and 12 show experimental results on the same observables for an antenna mounted on a platform which is not rotating according to an embodiment of the present disclosure.
Figure 12:
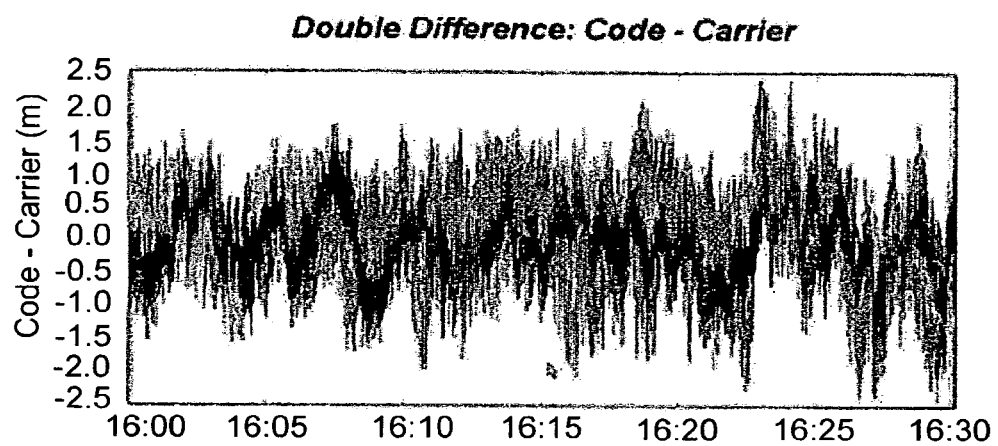

FIGS. 11 and 12 show a ½ hour of data collected on the same device while the rotation was turned off. It is clear that the static data suffers from much slower changing multipath than the rotating one.

For implementing embodiments of the present disclosure described herein using the rotating platform, a rotation motor device such as that used in Trimble's S6 Total Station can be used to provide accurate and dependable operation. Azimuth sensors such as those used in Trimble's S6 Total Stations could also be used to provide accurate measurements of the present heading angle.

According to embodiments of the present disclosure, the above-described antenna systems can be provided in paving, milling and/or grading systems to increase accuracy and reduce costs. For example, today, even with optimal data, the target of 5 mm (95%) vertical accuracy can not be met without additional augmentation. Due to the slowly changing nature of static multipath, costly inertial sensors are currently used with a conventional fixed antenna. That is, because of the longer correlation time for a slowly moving paving machine and the level of accuracy desired, the use of inertial sensors of the highest possible accuracy level are required. Such high accuracy inertial sensors can be quite costly. Utilizing aspects of the present disclosure, the correlation time can be reduced, thus allowing the use of cheaper inertial sensors. Embodiments of the present disclosure thus provide mm vertical accuracy for paving, milling and/or grading construction machines at relatively low cost. Other applications of embodiments of the present disclosure can be utilized to mitigate multipath error on reference station data for regional or global reference station networks, thus improving the observable quality and thus estimation (ambiguities, orbits), ambiguity resolution and corrections provided to the field user. Embodiments of the present disclosure may also be suitably utilized at reference stations set up by unskilled personal or where only suboptimal locations are available such as at construction sites which also experience high multipath levels leading to compromised positioning performance. The multipath mitigation effect can also be exploited for the pseudorange observables. This has an effect on the initialization times for an RTK system and improves code-base positioning (DGPS).

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for reducing multipath error when determining a location of a stationary or near stationary position, comprising:
   receiving a signal from an antenna moving continuously with respect to the stationary or near stationary position, the signal including a multipath component, wherein the antenna is moved in a circular pattern around the stationary or near stationary position;
   processing the received signal including the multipath component, wherein multipath error in the received signal is reduced during the processing; and
   determining a location of the stationary or near stationary position based on the processed received signal with the multipath error reduced.

2. The method as recited in claim 1, wherein a diameter of the circular pattern is equivalent to at least one GNSS wavelength.

3. The method as recited in claim 2, wherein the diameter is at least 24 cm.

4. A method for reducing multipath error when determining a location of a stationary or near stationary position, comprising:
   receiving a signal from an antenna moving continuously with respect to the stationary or near stationary position, the signal including a multipath component, wherein the antenna is moved in epicycles;
   processing the received signal including the multipath component, wherein multipath error in the received signal is reduced during the processing; and
   determining a location of the stationary or near stationary position based on the processed received signal with the multipath error reduced.

5. A method for reducing multipath error when determining a location of a stationary or near stationary position, comprising:
   receiving a signal from an antenna moving continuously with respect to the stationary or near stationary position, the signal including a multipath component, wherein the antenna is moved in a pattern such that it crosses a minima and a maxima of at least one GNSS wavelength;
   processing the received signal including the multipath component, wherein multipath error in the received signal is reduced during the processing; and
   determining a location of the stationary or near stationary position based on the processed received signal with the multipath error reduced.

6. The method as recited in claim 5, wherein the at least one GNSS wavelength is based on a GPS L2 carrier wave frequency.

7. The method as recited in claim 6, wherein the GNSS wavelength is approximately 24 cm.

8. A method for reducing multipath error when determining a location of a stationary or near stationary position, comprising:
receiving a signal from an antenna moving continuously with respect to the stationary or near stationary position, the signal including a multipath component, wherein the antenna is continuously moved vertically with respect to the stationary or near stationary position;
processing the received signal including the multipath component, wherein multipath error in the received signal is reduced during the processing; and
determining a location of the stationary or near stationary position based on the processed received signal with the multipath error reduced.

9. The method as recited in claim 8, wherein the antenna is moved up and down a distance corresponding to at least one GNSS wavelength.

10. The method as recited in claim 9, wherein the at least one GNSS wavelength is approximately 24 cm.

11. A method for reducing multipath error when determining a location of a stationary or near stationary position, comprising:
receiving a signal from an antenna moving continuously with respect to the stationary or near stationary position, the signal including a multipath component;
processing the received signal including the multipath component, wherein multipath error in the received signal is reduced during the processing; and
determining a location of the stationary or near stationary position based on the processed received signal with the multipath error reduced, wherein the determining step comprises determining a location of the antenna and referencing back from there to the location of the stationary or near stationary position.

12. The method as recited in claim 1, wherein the multipath error is averaged out during the processing.

13. The method as recited in claim 1, wherein the multipath error is filtered out during processing.

14. A system for reducing multipath error when determining a location of a stationary or near stationary position, comprising:
a moving platform having an antenna mounted thereto, the moving platform moving the antenna continuously with respect to the stationary or near stationary position, wherein the moving platform rotates to move the antenna in a circular pattern around the stationary or near stationary position;
a receiver for receiving a signal from the continuously moving antenna, the signal including a multipath component;
a processor for processing the received signal including the multipath component, wherein multipath error in the received signal is reduced during the processing; and
a location determining unit for determining a location of the stationary or near stationary position based on the processed received signal with the multipath error reduced.

15. The system as recited in claim 14, wherein the circular pattern is centered over the stationary or near stationary position.

16. A system for reducing multipath error when determining a location of a stationary or near stationary position, comprising:
a moving platform having an antenna mounted thereto, the moving platform moving the antenna continuously with respect to the stationary or near stationary position, wherein the antenna is mounted on the moving platform a distance corresponding to at least one-half of one GNSS wavelength from the stationary or near stationary position;
a receiver for receiving a signal from the continuously moving antenna, the signal including a multipath component;
a processor for processing the received signal including the multipath component, wherein multipath error in the received signal is reduced during the processing; and
a location determining unit for determining a location of the stationary or near stationary position based on the processed received signal with the multipath error reduced.

17. The system as recited in claim 16, wherein the GNSS wavelength is approximately 24 cm.

18. A system for reducing multipath error when determining a location of a stationary or near stationary position, comprising:
a moving platform having an antenna mounted thereto, the moving platform moving the antenna continuously with respect to the stationary or near stationary position, wherein the moving platform moves the antenna in epicycles;
a receiver for receiving a signal from the continuously moving antenna, the signal including a multipath component;
a processor for processing the received signal including the multipath component, wherein multipath error in the received signal is reduced during the processing; and
a location determining unit for determining a location of the stationary or near stationary position based on the processed received signal with the multipath error reduced.

19. A system for reducing multipath error when determining a location of a stationary or near stationary position, comprising:
a moving platform having an antenna mounted thereto, the moving platform moving the antenna continuously with respect to the stationary or near stationary position, wherein the moving platform moves the antenna in a pattern such that it crosses a minima and maxima of at least one GNSS wavelength;
a receiver for receiving a signal from the continuously moving antenna, the signal including a multipath component;
a processor for processing the received signal including the multipath component, wherein multipath error in the received signal is reduced during the processing; and
a location determining unit for determining a location of the stationary or near stationary position based on the processed received signal with the multipath error reduced.

20. The system as recited in claim 19, wherein the at least one GNSS wavelength is based on a GPS L2 carrier wave frequency.

21. The system as recited in claim 20, wherein the GNSS wavelength is approximately 24 cm.

22. A system for reducing multipath error when determining a location of a stationary or near stationary position, comprising:
a moving platform having an antenna mounted thereto, the moving platform moving the antenna continuously with respect to the stationary or near stationary position, wherein the moving platform continuously moves the antenna vertically with respect to the stationary or near stationary position;

a receiver for receiving a signal from the continuously moving antenna, the signal including a multipath component;

a processor for processing the received signal including the multipath component, wherein multipath error in the received signal is reduced during the processing; and a location determining unit for determining a location of the stationary or near stationary position based on the processed received signal with the multipath error reduced.

23. The system as recited in claim 22, wherein the antenna is moved up and down a distance corresponding to at least one GNSS wavelength.

24. The system as recited in claim 23, wherein the at least one GNSS wavelength is approximately 24 cm.

25. The system as recited in claim 23 wherein the location determining unit determines a location of the antenna and references back from there to the location of the stationary or near stationary position.

26. The system as recited in claim 14, wherein the multipath error is averaged out during the processing.

27. The system as recited in claim 14, wherein the multipath error is filtered out during processing.

* * * * *